United States Patent
Colyer

(10) Patent No.: US 10,883,013 B2
(45) Date of Patent: *Jan. 5, 2021

(54) COATINGS WITH FLEXIBLE HYPERBRANCHED POLYOLS

(71) Applicant: BASF Coatings GmbH, Muenster (DE)

(72) Inventor: Emerson Keith Colyer, Whitehouse, OH (US)

(73) Assignee: BASF Coatings GmbH, Muenster (DE)

( * ) Notice: Subject to any disclaimer, the term of this patent is extended or adjusted under 35 U.S.C. 154(b) by 451 days.

This patent is subject to a terminal disclaimer.

(21) Appl. No.: 15/326,722

(22) PCT Filed: Jun. 11, 2015

(86) PCT No.: PCT/EP2015/063072
§ 371 (c)(1),
(2) Date: Jan. 17, 2017

(87) PCT Pub. No.: WO2016/008655
PCT Pub. Date: Jan. 21, 2016

(65) Prior Publication Data
US 2017/0190931 A1   Jul. 6, 2017

Related U.S. Application Data

(63) Continuation of application No. 14/335,373, filed on Jul. 18, 2014, now Pat. No. 9,938,429.

(51) Int. Cl.
| C08G 63/668 | (2006.01) |
| C09D 167/00 | (2006.01) |
| B05D 7/00 | (2006.01) |
| C09D 201/00 | (2006.01) |
| C08G 63/78 | (2006.01) |

(52) U.S. Cl.
CPC .......... *C09D 167/00* (2013.01); *B05D 7/532* (2013.01); *C08G 63/668* (2013.01); *C08G 63/78* (2013.01); *C09D 201/005* (2013.01)

(58) Field of Classification Search
CPC .............. C08G 63/668; C09D 167/00; C09D 201/005
See application file for complete search history.

(56) References Cited

U.S. PATENT DOCUMENTS

| 3,001,973 A | 9/1961 | Piepenbrink et al. |
| 3,082,180 A | 3/1963 | Boldizar et al. |
| 3,124,605 A | 3/1964 | Wagner |
| 3,152,162 A | 10/1964 | Fischer et al. |
| 3,201,372 A | 8/1965 | Wagner |
| 3,394,164 A | 7/1968 | McClellan et al. |
| 3,644,457 A | 2/1972 | König et al. |
| 4,105,708 A | 8/1978 | Parekh |
| 4,293,692 A | 10/1981 | Pai et al. |
| 5,578,675 A | 11/1996 | Mormile et al. |
| 5,834,118 A | 11/1998 | Ranby et al. |
| 6,515,192 B1 | 2/2003 | Rink et al. |
| 6,569,956 B1 | 5/2003 | Ramesh |
| 6,646,049 B2 | 11/2003 | Ramesh |
| 6,861,150 B2 | 3/2005 | Ramesh et al. |
| 7,226,971 B2 | 6/2007 | Ramesh et al. |
| 7,858,732 B2 * | 12/2010 | Bruchmann ........... C08G 63/20 428/480 |
| 7,858,733 B2 | 12/2010 | Bruchmann et al. |
| 8,969,438 B2 | 3/2015 | Van Den Haak et al. |
| 2002/0026015 A1 * | 2/2002 | Ramesh ............... C08G 63/123 525/437 |
| 2002/0082359 A1 | 6/2002 | Ramesh |
| 2003/0050432 A1 * | 3/2003 | Ramesh ................ B01F 17/005 528/354 |
| 2004/0171748 A1 | 9/2004 | Ramesh et al. |
| 2007/0213501 A1 | 9/2007 | Bruchmann et al. |
| 2009/0275680 A1 | 11/2009 | Bruchmann et al. |
| 2009/0281271 A1 | 11/2009 | Bruchmann et al. |
| 2010/0048813 A1 | 2/2010 | Clauss et al. |

(Continued)

FOREIGN PATENT DOCUMENTS

| CN | 101583650 A | 11/2009 | |
| CN | 102321232 A | 1/2012 | |
| DE | 10163163 | * 12/2001 | ............ C09J 135/02 |

(Continued)

OTHER PUBLICATIONS

International Search Report dated Sep. 17, 2015 in PCT/EP2015/063072.
International Preliminary Report on Patentability and Written Opinion dated Jan. 24, 2017 in PCT/EP2015/063072.
Combined Russian Office Action and Search Report dated Nov. 16, 2018 in Patent Application No. 2017105280 (with English language translation of categories of cited documents).

* cited by examiner

*Primary Examiner* — Monique R Peets
(74) *Attorney, Agent, or Firm* — Oblon, McClelland, Maier & Neustadt, L.L.P.

(57) ABSTRACT

A coating composition includes a flexible hyperbranched polyol preparable by (a) reacting a polyol comprising at least three hydroxyl groups with an aliphatic dicarboxylic acid having from 6 to 36 carbon atoms or an esterifiable derivative of the aliphatic dicarboxylic acid to form a hydroxyl-functional first intermediate product; (b) reacting the first intermediate product with a cyclic carboxylic acid anhydride to form a carboxylic acid-functional second intermediate product; and (c) reacting the second intermediate product with an epoxide-functional compound having one epoxide group to form the hyperbranched polyol. The coating composition may be cured to a coating layer having excellent flexibility.

15 Claims, No Drawings

(56) References Cited

U.S. PATENT DOCUMENTS

2011/0135832 A1    6/2011  Lane et al.
2013/0136865 A1    5/2013  Groenewolt et al.

FOREIGN PATENT DOCUMENTS

| EA | 018439 B1 | 8/2013 |
| EP | 0 249 201 A2 | 12/1987 |
| EP | 0 276 501 A2 | 8/1988 |
| EP | 0 377 177 A1 | 7/1990 |
| JP | 62-13467 A | 1/1987 |
| JP | 2006-022216 A | 1/2006 |
| JP | 2013-163769 A | 8/2013 |
| WO | WO 94/22968 A1 | 10/1994 |
| WO | WO 96/07688 A1 | 3/1996 |
| WO | WO 97/12945 A1 | 4/1997 |

COATINGS WITH FLEXIBLE HYPERBRANCHED POLYOLS

FIELD OF THE INVENTION

The invention concerns coating compositions that are thermosetting. In particular, the invention is directed to improved flexibility for coatings prepared using hyperbranched or dendritic polyols.

BACKGROUND

This section provides information helpful in understanding the invention but that is not necessarily prior art.

Rink, U.S. Pat. No. 6,515,192, issued Feb. 4, 2003, discloses hyperbranched compounds having a tetrafunctional central group of the general formula $C[-A_q-X-]_m[-A_r-X-]_n[-A_s-X-]_o[-A_t-X-]$, in which $m+n+o+p=4$, m=an integer from 1 to 3 and n, o and p=0 or an integer from 1 to 3; q, r, s and t=an integer from 1 to 5, where q>r, s and t; X=—O—, —S— or —NH—; A=—CR2-; where R=—H, —F, —Cl, —Br, —CN, —NO$_2$, C1 to C3 alkyl or C1 to C3 haloalkyl or C1 to C3 alkoxy radical or, if q, r, s and/or t=at least 2, a C2 to C4 alkanediyl and/or C2-C4 oxaalkanediyl radical which bridges 2 to 5 carbon atoms, and/or an oxygen atom —O—, which bridges 3 to 5 carbon atoms, of the radical -A-.

Ramesh, U.S. Pat. No. 6,569,956, issued May 27, 2003, discloses a hyperbranched polyester polyol macromolecule having a plurality of both embedded and exterior hydroxyl groups. The hyperbranched polyol includes a central nucleus, a first chain extension, an intermediate substituent and a second chain extension. The central nucleus is a hydrocarbon structure with a plurality of oxygen atoms. The first chain extender is attached to the central nucleus and includes a carboxylic ester group and a plurality of hydroxyl groups. The intermediate substituent is attached to the first chain extender and is a polyfunctional carboxylic acid or anhydride. The preferred intermediate substituent is a cyclic compound. The second chain extension is attached to the intermediate substituent. The preferred second chain extension includes a glycidyl ester or epoxy. Also disclosed are coating compositions in which the hyperbranched polyol is reacted with an aminoplast or with an isocyanate.

Ramesh, U.S. Pat. No. 6,646,049, issued Nov. 11, 2003, discloses a binder for a coating composition with a principal resin polyol in combination with a hyper-branched polyol as a reactive intermediate and at least one crosslinker. The principal resin polyol is at least one of a polyester polyol, a polyether polyol, and a polyacrylate. Hyper-branched polyester polyols may be used as reactive diluents, which will cross-link with isocyanates, isocyanurates, epoxides, anhydrides or their corresponding polyacids and/or aminoplasts to form a binder having particular properties, to help control the rheology of a coating system. The hyperbranched polyol, the principal resin polyol, or both may, optionally, include a carbamate functional group. Coating compositions may be made using the binders together with additional components.

Ramesh et al., U.S. Pat. No. 6,861,150 issued Mar. 1, 2005 discloses a rheology control agent for a coating composition that is the reaction product of a first compound comprising a plurality of hydroxyl groups, of a lactone compound, and of a carbamate compound.

Ramesh et al., U.S. Pat. No. 7,226,971, issued Jun. 5, 2007, discloses a polyester resin for use in a coating composition. The polyester resin is the reaction product of a first compound comprising a plurality of hydroxyl groups, a lactone compound, a carboxylic acid anhydride, an epoxy compound having at least one epoxy group, and a carbamate compound.

Bruchmann et al., U.S. Pat. No. 7,858,733, issued Dec. 28, 2010, discloses high-functionality, highly branched or hyperbranched polyesters based on di-, tri- or polycarboxylic acids and di-, tri- or polyols, processes for preparing them, and their use in coatings. The high-functionality highly branched or hyperbranched polyesters have a molecular weight $M_n$ of at least 500 g/mol and a polydispersity $M_w/M_n$ of 1.2-50, obtainable by reacting at least one aliphatic, cycloaliphatic, araliphatic or aromatic dicarboxylic acid (A2) or derivatives thereof and at least one divalent aliphatic, cycloaliphatic, araliphatic, or aromatic alcohol (B2), containing 2 OH groups, with either a) at least one x-valent aliphatic, cycloaliphatic, araliphatic or aromatic alcohol ($C_x$) containing more than two OH groups, x being a number greater than 2, preferably between 3 and 8, particularly preferably between 3 and 6, more preferably from 3 to 4 and in particular 3 or b) at least one aliphatic, cycloaliphatic, araliphatic or aromatic carboxylic acid ($D_y$) or derivatives thereof containing more than two acid groups, y being a number greater than 2, preferably between 3 and 8, more preferably between 3 and 6, very preferably from 3 to 4 and in particular 3, in each case in the presence if appropriate of further functionalized building blocks E and c) subsequently reacting the product, if appropriate, with a monocarboxylic acid F, and the ratio of the reactive groups in the reaction mixture being chosen so as to set a molar ratio of OH groups to carboxyl groups or derivatives thereof of from 5:1 to 1:5, preferably from 4:1 to 1:4, more preferably from 3:1 to 1:3 and very preferably from 2:1 to 1:2.

It remains desirable to make further improvements in coating compositions containing hyperbranched polyols by using a more flexible, hyperbranched polyol that provides a coating layer with excellent properties and permits the coating composition to be made with a low content of volatile organic compounds.

SUMMARY OF THE DISCLOSURE

Disclosed is a coating composition including a flexible hyperbranched polyol preparable by (a) reacting a polyol comprising at least three hydroxyl groups with an aliphatic dicarboxylic acid having from 6 to 36 carbon atoms or an esterifiable derivative of the aliphatic dicarboxylic acid to form a hydroxyl-functional first intermediate product; (b) reacting the first intermediate product with a cyclic carboxylic acid anhydride to form a carboxylic acid-functional second intermediate product; and (c) reacting the second intermediate product with an epoxide-functional compound having one epoxide group to form the hyperbranched polyol. Esterifiable derivatives of the dicarboxylic acid having from 6 to 36 carbon atoms are their anhydrides and esterifiable esters.

In various embodiments, the ratio in step (a) of moles of the polyol to moles of the dicarboxylic acid or esterifiable derivative of the aliphatic dicarboxylic acid is from about 2.0 to about 2.5 moles of the polyol per mole of the dicarboxylic acid or esterifiable derivative of the aliphatic dicarboxylic acid. Particularly preferably, on average about one hydroxyl group of each polyol molecule is reacted with the dicarboxylic acid in step (a). In various embodiments, the equivalent ratio in step (b) of hydroxyl groups of the first intermediate product to anhydride groups of the cyclic carboxylic acid anhydride is from about 1.0 to about 1.25 equivalents of hydroxyl groups per carboxylic anhydride groups. Particularly preferably, substantially all of the hydroxyl groups are reacted with an anhydride group in step (b). In various embodiments, the equivalent ratio in step (c) of carboxylic acid groups of the second intermediate product to epoxide groups of the epoxide-functional compound is from about 1.0 to about 2.5 equivalents of carboxylic acid groups per equivalents epoxide groups.

The coating composition may be organic solvent-based (or solventborne) or water-based (waterborne). The equivalent ratio in step (c) of carboxylic acid groups of the second intermediate product to epoxide groups of the epoxide-functional compound is preferably from about 1.0 to about 1.1 equivalents of carboxylic acid groups per equivalents epoxide groups when making an organic solvent-based coating composition. In various embodiments, the coating composition is aqueous, the equivalent ratio in step (c) of carboxylic acid groups of the second intermediate product to epoxide groups of the epoxide-functional compound is from about 1.1 to about 2.5 equivalents of carboxylic acid groups per equivalents epoxide groups, and the unreacted carboxylic acid groups are at least partially neutralized with a base.

A coating produced from the coating composition containing the flexible hyperbranched polyol has excellent durability, low volatile organic content, and improved flexibility, particularly at low temperatures.

"A," "an," "the," "at least one," and "one or more" are used interchangeably to indicate that at least one of the item is present; the indefinite articles indicate a plurality of such items may be present unless the context clearly indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range. Each value within a range and the endpoints of a range are hereby all disclosed as separate embodiments. In this description of the invention, for convenience, "polymer" and "resin" are used interchangeably to encompass resins, oligomers, and polymers. The terms "comprises," "comprising," "including," and "having," are inclusive and therefore specify the presence of stated items, but do not preclude the presence of other items. As used in this specification, the term "or" includes any and all combinations of one or more of the listed items.

DETAILED DESCRIPTION

A detailed description of exemplary, nonlimiting embodiments follows.

The flexible, hyperbranched polyol used in making the coating compositions can be prepared by a synthesis having a step (a) of reacting a polyol comprising at least three hydroxyl groups with an aliphatic dicarboxylic acid having from 6 to 36 carbon atoms or an esterifiable derivative of the aliphatic dicarboxylic acid to form a hydroxyl-functional first intermediate product.

The aliphatic dicarboxylic acid having from 6 to 36 carbon atoms or esterifiable derivative of the aliphatic dicarboxylic acid may be linear, branched, or cyclic, with the proviso that cyclic dicarboxylic acids include a noncyclic segment of at least about 6 carbon atoms. Nonlimiting examples of suitable dicarboxylic acids include adipic acid, suberic acid, azelaic acid, sebacic acid, undecanedioic acid (brassylic acid), dodecanedioic acid, traumatic acid, hexadecanedioic acid (thapsic acid), octadecanedioic acid, tetradecanedioic acid, and dimer fatty acids having 36 carbon atoms. In various embodiments, α,ω-dicarboxylic acids and dimer fatty acids having 36 carbon atoms are preferred.

It is known that dimer fatty acids having 36 carbon atoms may have multiple isomers. Dimer fatty acids are commercially available, for example from BASF under the trademark EMPOL®, from Arizona Chemical under the trademark UNIDYME™, from Croda International Plc under the trademark Pripol™, and from Emery Oleochemicals as EMERY® Dimer Acids Esterifiable derivatives of the dicarboxylic acids having from 6 to 36 carbon atoms include their mono- or diesters with aliphatic alcohols having 1 to 4 carbon atoms, preferably the methyl and ethyl esters, as well as the anhydrides.

The aliphatic dicarboxylic acid having from 6 to 36 carbon atoms is reacted with a polyol comprising at least three hydroxyl groups. The hydroxyl groups of the polyol can be primary, secondary, and/or tertiary hydroxyl groups.

The polyol may be selected from triols, dimers of triols, tetrols, dimers tetrols, and sugar alcohols. Nonlimiting examples of suitable polyols having three or more hydroxyl groups include glycerol, trimethylolmethane, trimethylolethane, trimethylolpropane, 2,2,3-trimethylolbutane-1,4-diol, 1,2,4-butanetriol, 1,2,6-hexanetriol, tris(hydroxymethyl)amine, tris(hydroxyethyl)amine, tris(hydroxypropyl)amine, erythritol, pentaerythritol, diglycerol, triglycerol or higher condensates of glycerol, di(trimethylolpropane), di(pentaerythritol), pentaerythritol ethoxylate, pentaerythritol propoxylate, trishydroxymethyl isocyanurate, tris(hydroxyethyl) isocyanurate (THEIC), tris(hydroxypropyl) isocyanurate, inositols or sugars, such as glucose, fructose or sucrose, for example, sugar alcohols such as xylitol, sorbitol, mannitol, threitol, erythritol, adonitol (ribitol), arabitol (lyxitol), xylitol, duicitol (galactitol), maltitol, isomalt, polyetherols with a functionality of three or more, based on alcohols with a functionality of three reacted with ethylene oxide, propylene oxide and/or butylene oxide.

in certain preferred embodiments, the first polyol of step (a) is at least one of erythritol, pentaerythritol, dipentaerythritol, trimethylolethane, trimethylolpropane, tri methylolbutane, glycerol, ditrimethylolethane, ditrimethylolpropane, pentaerythritol ethoxylate, and pentaerythritol propoxylate In various examples, the ratio in step (a) of moles of the polyol to moles of the dicarboxylic acid or esterifiable derivative of the aliphatic dicarboxylic acid is from about 2.0 to about 2.5, preferably from about 2.0 to about 2.2, and more preferably from about 2.0 to about 2.07 moles of the polyol per mole of the dicarboxylic acid or esterifiable derivative of the aliphatic dicarboxylic acid. Particularly preferably, on average about one hydroxyl group of each polyol molecule is reacted with the dicarboxylic acid in step (a).

The esterification step (a) may be carried out by known, standard methods. For example, this reaction is conventionally carried out at temperatures of between about 180° C. and about 280° C. in the presence, if desired, of an appropriate esterification catalyst. Typical catalysts for the esterification polymerization are protonic acids and Lewis acids, for example sulfuric acid, para-toluenesulfonic acid, sulfates and hydrogen sulfates, such as sodium hydrogen sulfate, phosphoric acid, phosphonic acid, hypophosphorous acid, titanium alkoxides, and dialkyltin oxides, for example dibutyltin oxide, dibutyltin dilaurate, lithium octanoate, under reflux with small quantities of a suitable solvent as entraining agent such as an aromatic hydrocarbon, for example xylene, or a (cyclo)aliphatic hydrocarbon, for example cyclohexane. As a non-limiting, specific example, the polyester may include stannous octoate or dibutyltin oxide. An acidic inorganic, organometallic, or organic catalyst can be used in an amount from 0.1% to 10% by weight, preferably from 0.2% to 2% by weight, based on total weight of the reactants. It may be desirable to carry out the reaction step (a) free of catalyst to avoid or minimize side reactions during subsequent steps.

The esterification of step (a) can be carried out in bulk or in the presence of a solvent that is nonreactive toward the reactants. Nonlimiting examples of suitable solvents include hydrocarbons such as paraffins or aromatics. In some embodiments it may be preferred to use n-heptane, cyclohexane, toluene, ortho-xylene, meta-xylene, para-xylene, xylene isomer mixtures, ethylbenzene, chlorobenzene and ortho- and meta-dichlorobenzene. Other solvents that may be used in the absence of acidic catalysts are ethers, such as dioxane or tetrahydrofuran, for example, and ketones such as methyl ethyl ketone and methyl isobutyl ketone, for example. The solvent may be used to aid in removing by-product of the esterification reaction azeotropically by distillation.

The amount of solvent that can be used may be at least 0.1% by weight or at least 1% by weight or at least 5% by weight, based on the weight of the starting reactants. Higher amounts of solvent may be used, but it is preferred to keep the concentration of reactants high enough to permit the reaction to be carried out in a commercially viable length of time. Examples of ranges of the solvent that may be employed are from 0.1% to about 20% by weight, or from about 1% to about 15% by weight, or from about 5% to about 10% by weight, based in each case on the weight of the starting reactants.

The reaction may be carried out in the presence of a water-removing agent, for example molecular sieves, especially molecular sieve 4 Å, $MgSO_4$ and $Na_2SO_4$.

The reaction of step (a) may be carried out at temperatures of 60° C. to 250° C., for example at temperatures of 100° C. to 240° C. In certain embodiments the reaction of step (a) may be carried out at temperatures of 150° C. to 235° C. The reaction time depends upon known factors, which include temperature, concentration of reactants, and presence and identity of catalyst, if any. Typical reaction times may be from about 1 to about 20 hours.

To minimize final volatile organic content, as much of the solvent used to azeotrope the byproduct from step (a) as is practical may be removed after completion of the reaction of step (a). Small amounts of solvents selected for their performance in the final resin can be used throughout the rest of the synthesis, for example as a flush following a reagent addition. Solvents that can react with anhydrides or epoxides, such as active hydrogen-containing compounds like hydroxy-functional solvents (e.g., alcohols and monoethers of glycols), are preferably avoided during both step (a) and subsequent reaction steps. After step (a), the reaction temperature is preferably kept below at temperature at which condensation-type esterification reactions could take place, for example kept below 150° C., for the remainder of the synthesis to minimize the chance of condensation-type esterification reactions which, at this stage of the synthesis, would have undesirable effects on the molecular weight and architecture. For example, further esterification could produce unwanted branching or an undesirably increased molecular weight. The reaction temperature for steps subsequent to step (a) may be kept below 145° C., below 140° C., or even below 135° C. or 130° C. depending on whether a catalyst is used during step (a) and the nature of any catalyst used.

The hydroxyl-functional first intermediate product prepared in step (a) is then reacted with a cyclic carboxylic acid anhydride to form a carboxylic acid-functional second intermediate product. The cyclic carboxylic acid anhydride reacts with at least one of the hydroxyl groups of the hydroxyl-functional first intermediate product to form the second intermediate product having at least one carboxyl group. Preferably, the cyclic carboxylic acid anhydride is reacted with all or substantially all of the hydroxyl groups of the first intermediate product to form the second intermediate product. The cyclic carboxylic acid anhydride reacted in step (b) may be either an aromatic or aliphatic cyclic anhydride.

In certain embodiments, the cyclic carboxylic acid anhydride is at least one of maleic anhydride, hexahydrophthalic anhydride, methylhexahydrophthalic anhydride, tetrahydrophthalic anhydride, phthalic anhydride, succinic anhydride, trimellitic anhydride, methyltetrahydrophthalic anhydride, adipic anhydride, glutaric anhydride, malonic anhydride, itaconic acid anhydride, 5-methyl-5-nobornenedicarboxylic acid anhydride, 1,2-cyclohexanedicarboxylic acid anhydride, isatoic acid anhydride, diphenic acid anhydride, substituted anhydrides, particularly including lower-alkyl substituted acid anhydrides such as butylsuccinic acid anhydride, hexylsuccinic acid anhydride, octylsuccinic acid anhydride, butylmaleic acid anhydride, pentylmaleic acid anhydride, hexylmaleic acid anhydride, octylmaleic acid anhydride, butylglutaric acid anhydride, hexylglutaric acid anhydride, heptylglutaric acid anhydride, octylglutaric acid anhydride, alkylcyclohexanedicarboxylic acid anhydrides and alkylphthalic acid anhydrides such as 4-n-butylphthalic acid anhydride, hexylphthalic acid anhydride, and octylphthalic acid anhydride.

In one particular embodiment, the carboxylic acid anhydride comprises hexahydrophthalic anhydride. Hexahydrophthalic anhydride may in some cases be the only carboxylic acid anhydride used in the reaction of step (b).

The reaction of step (b) provides a second intermediate product with a carboxylic acid group for each molecule of cyclic carboxylic acid anhydride reacted with the hydroxyl-functional first intermediate product of step (a). In some example embodiments, the equivalent ratio of the cyclic carboxylic acid anhydride to the first intermediate product is from about 0.8 to about 1.0, preferably from about 0.85 to about 1.0, and more preferably from about 0.9 to about 1.0 equivalents of anhydride groups per equivalent of hydroxyl groups. In one example embodiment, one molecule or substantially one molecule of hexahydrophthalic anhydride reacts with each hydroxyl group of the first intermediate product to form the second intermediate product. In preferred embodiments, substantially all hydroxyl groups of the hydroxyl-functional first intermediate product are reacted with the carboxylic acid anhydride to provide an ester of the hydroxyl group and a carboxylic acid group from opening the cyclic anhydride.

The anhydride ring-opening reaction of step (b) is exothermic. The reaction temperature can be controlled, for example to not exceed about 150° C., by dividing carboxylic acid anhydride reactant addition into two or more added portions. For example, a first added portion may be about one-third to about one-half of the carboxylic acid anhydride and a second portion may be the balance of the carboxylic acid anhydride being reacted in step (b). The temperature of the reaction mixture may be allowed to cool to about 90° C. to 95° C. before each portion is added. After the first portion is added, the reaction mixture may be heated to about 110° C. to 115° C., or higher, resulting in an exotherm that may be allowed to carry the temperature of the reaction mixture upward, but not to exceed the target maximum, for example 150° C. After the exotherm, the reaction mixture may be cooled to about 90° C. to 95° C. for a second anhydride addition. Similarly, after the second anhydride addition has been completed, the reaction mixture may be heated to about 110° C. to 115° C., or higher, after which the reaction exotherm, (and additional heat, if needed), are used to bring the temperature of the reaction mixture up to, for example from about 135° C. to about 145° C. or from about 140° C. to about 145° C., where the reaction mixture is held to allow the reaction to complete. Again, the batch should not to exceed 150° C.

In a third step (c), from least about two carboxylic acid groups to all of the carboxylic acid groups of the second intermediate product are reacted with an epoxide-functional compound having one epoxide group to form the hyperbranched polyol. Mono-epoxide compounds are well-known in the art, and may be characterized by the general formula:

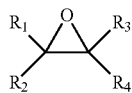

where $R_1$, $R_2$, $R_3$ and $R_4$ are each independently hydrogen or an organic radical, with the proviso that at least one of $R_1$-$R_4$ is other than hydrogen, and may contain unsaturation or heteroatoms or two of $R_1$-$R_4$ may form a cyclic ring, which may contain unsaturation or heteroatoms.

For example, the epoxide-functional compound may be an epoxy ester, also known as a glycidyl ester. Glycidyl esters can be prepared by reacting a monofunctional carboxylic acid with an epihalohydrin (e.g., epichlorohydrin) under conditions well known in the art. Examples of glycidyl esters are glycidyl acetate, glycidyl propionate, glycidyl methyl maleate, glycidyl stearate, glycidyl benzoate, and glycidyl oleate. Among useful glycidyl esters are those having an alkyl group having from 7 to 17 carbon atoms. A particularly preferred glycidyl ester is a glycidyl ester of a saturated synthetic tertiary monocarboxylic acid having 9-11 carbon atoms. In a preferred embodiment, the monofunctional carboxylic acid used to produce the glycidyl esters is a neoalkanoic acid such as, without limitation, neodecanoic or neononanoic acid. Glycidyl esters of neoacids are commercially available, e.g., under the trademark Cardura® from Momentive Specialty Chemicals, Inc., Columbus, Ohio.

Another useful class of monoepoxides is glycidyl ethers. Glycidyl ethers can be prepared by the reaction of monofunctional alcohols (e.g., n-butanol, propanol, 2-ethylhexanol, dodecanol, phenol, cresol, cyclohexanol, benzyl alcohol) with an epihalohydrin (e.g., epichlorohydrin). Useful glycidyl ethers include methyl glycidyl ether, ethyl glycidyl ether, propyl glycidyl ether, butyl glycidyl ether, pentyl glycidyl ether, hexyl glycidyl ether, heptyl glycidyl ether, octyl glycidyl ether, nonyl glycidyl ether, decyl glycidyl ether, undecyl glycidyl ether, dodecyl glycidyl ether, tridecyl glycidyl ether, tetradecyl glycidyl ether, pentadecyl glycidyl ether, hexadecyl glycidyl ether, heptadecyl glycidyl ether, octadecyl glycidyl ether, nonadecyl glycidyl ether, eicosyl glycidyl ether, heneicosyl glycidyl ether, docosyl glycidyl ether, tricosyl glycidyl ether, tetracosyl glycidyl ether, pentacosyl glycidyl ether, decenyl glycidyl ether, undecenyl glycidyl ether, tetradecenyl glycidyl ether, hexadecenyl glycidyl ether, heptadecenyl glycidyl ether, octadecenyl glycidyl ether, nonadecenyl glycidyl ether, eicosenyl glycidyl ether, heneicosenyl glycidyl ether, docosenyl glycidyl ether, tricosenyl glycidyl ether, tetracosenyl glycidyl ether and pentacosenyl glycidyl ether.

The equivalent ratio in step (c) of carboxylic acid groups of the second intermediate product to epoxide groups of the epoxide-functional compound may be from about 1.0 to about 2.5, or from about 1.0 to about 2.0, or from about 1.0 to about 1.5, or from about 1.0 to about 1.3, or from about 1.0 to about 1.1 equivalents of carboxylic acid groups per equivalents epoxide groups. The preferred range of equivalents of carboxylic acid groups to epoxide groups will vary, however, depending on whether the embodiment will be for a solventborne or waterborne coating composition. In one embodiment, the hyperbranched polyol is used in a solventborne coating composition and every or substantially every carboxyl group of the second intermediate product is reacted with a monoepoxide compound. In other embodiments, on average some of the carboxyl groups are left unreacted and may be neutralized, for example with ammonia, an amine, or another base in forming a waterborne coating composition.

Coating Compositions

A desired amount of the hyperbranched polyol is included in the coating composition. The amount of the hyperbranched polyol included may vary depending on the characteristics of other coating components and the desired overall balance of performance characteristics of the coating obtained from the coating composition. In various examples, the coating composition may include from about 5% to about 60% by weight, or from about 5% to about 50% by weight, or from about 5% to about 45% by weight, or from about 10% to about 50% by weight, or from about 10% to about 45% by weight, or from about 10% to about 40% by weight, or from about 10% to about 35% by weight, or from about 15% to about 40% by weight, or from about 15% to about 35% by weight of the hyperbranched polyol based on the total amount of film-forming materials (also called the binder or vehicle of the coating composition).

The coating composition may include other reactive resins or polymers. Examples of useful resins or polymers include (meth)acrylate polymers (also known as acrylic polymers or resins), polyesters, polyethers, polyurethanes, polyols based on natural oils, such as those available under the trademark Polycins from Vertellus Specialties Inc., Indianapolis, Ind., for example a polyol based on castor oil, polysiloxanes, and those described in Mormile et al., U.S. Pat. No. 5,578,675; Lane et al., US Patent Application Publication No. 2011/0135832; and Groenewolt et al, U.S. Patent Application Publication No. 2013/0136865, each of which is incorporated herein by reference. The other resins or polymers may have functionality reactive with the crosslinker for the hyperbranched polyol, or that the coating composition may contain a further crosslinker for the other resins or polymer. In certain preferred examples, the coating composition includes a further resin or polymer having hydroxyl groups, carbamate groups, or a combination of such groups. In various embodiments, the coating composition contains a hydroxyl-functional acrylic polymer, hydroxyl-functional polyester, or hydroxyl-functional polyurethane.

Polyvinyl polyols, such as acrylic (polyacrylate) polyol polymers that may be used as the hydroxy-functional material. Acrylic polymers or polyacrylate polymers may be copolymers of both acrylic and methacrylic monomers as well as other copolymerizable vinyl monomers. The term "(meth)acrylate" is used for convenience to designate either or both acrylate, and methacrylate, and the term "(meth) acrylic" is used for convenience to designate either or both acrylic and methacrylic.

Hydroxyl-containing monomers include hydroxy alkyl esters of acrylic or methacrylic acid. Nonlimiting examples of hydroxyl-functional monomers include hydroxyethyl (meth)acrylate, hydroxypropyl (meth)acrylates, hydroxybutyl (meth)acrylates, hydroxyhexyl (meth)acrylates, propylene glycol mono(meth)acrylate, 2,3-dihydroxypropyl (meth)acrylate, pentaerythritol mono(meth)acrylate, polypropylene glycol mono(meth)acrylates, polyethylene glycol mono(meth)acrylates, reaction products of these with epsilon-caprolactone, and other hydroxyalkyl (meth)acrylates having branched or linear alkyl groups of up to about 10 carbons, and mixtures of these, where the term "(meth) acrylate" indicates either or both of the methacrylate and acrylate esters. Generally, at least about 5% by weight hydroxyl-functional monomer is included in the polymer. Hydroxyl groups on a vinyl polymer such as an acrylic polymer can be generated by other means, such as, for example, the ring opening of a glycidyl group, for example from copolymerized glycidyl methacrylate, by an organic acid or an amine. Hydroxyl functionality may also be introduced through thio-alcohol compounds, including, without limitation, 3-mercapto-1-propanol, 3-mercapto-2-butanol, 11-mercapto-1-undecanol, 1-mercapto-2-propanol, 2-mercaptoethanol, 6-mercapto-1-hexanol, 2-mercaptobenzyl alcohol, 3-mercapto-1,2-proanediol, 4-mercapto-1-butanol, and combinations of these. Any of these methods may be used to prepare a useful hydroxyl-functional acrylic polymer.

Examples of suitable comonomers that may be used include, without limitation, α,β-ethylenically unsaturated monocarboxylic acids containing 3 to 5 carbon atoms such as acrylic, methacrylic, and crotonic acids and the alkyl and cycloalkyl esters, nitriles, and amides of acrylic acid, methacrylic acid, and crotonic acid; α,β-ethylenically unsaturated dicarboxylic acids containing 4 to 6 carbon atoms and the anhydrides, monoesters, and diesters of those acids; vinyl esters, vinyl ethers, vinyl ketones, and aromatic or heterocyclic aliphatic vinyl compounds. Representative examples of suitable esters of acrylic, methacrylic, and crotonic acids include, without limitation, those esters from reaction with saturated aliphatic alcohols containing 1 to 20 carbon atoms, such as methyl, ethyl, propyl, isopropyl, n-butyl, isobutyl, tert-butyl, hexyl, 2-ethylhexyl, dodecyl, 3,3,5-trimethylhexyl, stearyl, lauryl, cyclohexyl, alkyl-substituted cyclohexyl, alkanol-substituted cyclohexyl, such as 2-tert-butyl and 4-tert-butyl cyclohexyl, 4-cyclohexyl-1-butyl, 2-tert-butyl cyclohexyl, 4-tert-butyl cyclohexyl, 3,3,5,5-tetramethyl cyclohexyl, tetrahydrofurfuryl, and isobornyl acrylates, methacrylates, and crotonates; unsaturated dialkanoic acids and anhydrides such as fumaric, maleic, itaconic acids and anhydrides and their mono- and diesters with alcohols such as methanol, ethanol, propanol, isopropanol, butanol, isobutanol, and tert-butanol, like maleic anhydride, maleic acid dimethyl ester and maleic acid monohexyl ester; vinyl acetate, vinyl propionate, vinyl ethyl ether, and vinyl ethyl ketone; styrene, α-methyl styrene, vinyl toluene, 2-vinyl pyrrolidone, and p-tert-butylstyrene.

The acrylic polymer may be prepared using conventional techniques, such as by heating the monomers in the presence of a polymerization initiating agent and optionally a chain transfer agent. The polymerization may be carried out in solution, for example. Typical initiators are organic peroxides such as dialkyl peroxides such as di-t-butyl peroxide, peroxyesters such as t-butyl peroxy 2-ethylhexanoate, and t-butyl peracetate, peroxydicarbonates, diacyl peroxides, hydroperoxides such as t-butyl hydroperoxide, and peroxyketals; azo compounds such as 2,2'azobis(2-methylbutanenitrile) and 1,1'-azobis(cyclohexanecarbonitrile); and combinations of these. Typical chain transfer agents are mercaptans such as octyl mercaptan, n- or tert-dodecyl mercaptan; halogenated compounds, thiosalicylic acid, mercaptoacetic acid, mercaptoethanol and the other thiol alcohols already mentioned, and dimeric alpha-methyl styrene.

The reaction is usually carried out at temperatures from about 20° C. to about 200° C. The reaction may conveniently be done at the temperature at which the solvent or solvent mixture refluxes, although with proper control a temperature below the reflux may be maintained. The initiator should be chosen to match the temperature at which the reaction is carried out, so that the half-life of the initiator at that temperature should preferably be no more than about thirty minutes. Further details of addition polymerization generally and of polymerization of mixtures including (meth) acrylate monomers is readily available in the polymer art. The solvent or solvent mixture is generally heated to the reaction temperature and the monomers and initiator(s) are added at a controlled rate over a period of time, usually between 2 and 6 hours. A chain transfer agent or additional solvent may be fed in also at a controlled rate during this time. The temperature of the mixture is then maintained for a period of time to complete the reaction. Optionally, additional initiator may be added to ensure complete conversion.

Oligomeric and polymeric ethers may be used, including diethylene glycol, triethylene glycol, tetraethylene glycol, pentaethylene glycol, dipropylene glycol, tripropylene glycol, linear and branched polyethylene glycols, polypropylene glycols, and block copolymers of poly(ethylene oxide-co-propylene oxide). Other polymeric polyols may be obtained by reacting a polyol initiator, e.g., a diol such as 1,3-propanediol or ethylene or propylene glycol or a polyol such as trimethylolpropane or pentaerythritol, with a lactone or alkylene oxide chain-extension reagent. Lactones that can be ring opened by active hydrogen are well known in the art. Examples of suitable lactones include, without limitation, ε-caprolactone, γ-caprolactone, β-butyrolactone, β-propriolactone, γ-butyrolactone, α-methyl-γ-butyrolactone, β-methyl-γ-butyrolactone, γ-valerolactone, δ-valerolactone, γ-decanolactone, δ-decanolactone, γ-nonanoic lactone, γ-octanoic lactone, and combinations of these. In one preferred embodiment, the lactone is ε-caprolactone. Useful catalysts include those mentioned above for polyester synthesis. Alternatively, the reaction can be initiated by forming a sodium salt of the hydroxyl group on the molecules that will react with the lactone ring. Similar polyester polyols may be obtained by reacting polyol initiator molecules with hydroxy acids, such as 12-hydroxystearic acid.

In other embodiments, a polyol initiator compound may be reacted with an oxirane-containing compound to produce a polyether diol to be used in the polyurethane elastomer polymerization. Alkylene oxide polymer segments include, without limitation, the polymerization products of ethylene oxide, propylene oxide, 1,2-cyclohexene oxide, 1-butene oxide, 2-butene oxide, 1-hexene oxide, tert-butylethylene oxide, phenyl glycidyl ether, 1-decene oxide, isobutylene oxide, cyclopentene oxide, 1-pentene oxide, and combinations of these. The oxirane-containing compound is preferably selected from ethylene oxide, propylene oxide, butylene oxide, tetrahydrofuran, and combinations of these. The alkylene oxide polymerization is typically base-catalyzed. The polymerization may be carried out, for example, by charging the hydroxyl-functional initiator compound and a catalytic amount of caustic, such as potassium hydroxide, sodium methoxide, or potassium tert-butoxide, and adding the alkylene oxide at a sufficient rate to keep the monomer available for reaction. Two or more different alkylene oxide monomers may be randomly copolymerized by coincidental addition or polymerized in blocks by sequential addition. Homopolymers or copolymers of ethylene oxide or propylene oxide are preferred. Tetrahydrofuran may be polymerized by a cationic ring-opening reaction using such counterions as $SbF_6^-$, $AsF_6^-$, $PF_6^-$, $SbCl_6^-$, $BF_4^-$, $CF_3SO_3^-$, $FSO_3^-$, and $ClO_4^-$. Initiation is by formation of a tertiary oxonium ion. The polytetrahydrofuran segment can be prepared as a "living polymer" and terminated by reaction with the hydroxyl group of a diol such as any of those mentioned above. Polytetrahydrofuran is also known as polytetramethylene ether glycol (PTMEG). Any of the polyols mentioned above maybe employed as the polyol initiator and extended in this fashion.

Nonlimiting examples of suitable polycarbonate polyols that might be used include those prepared by the reaction of polyols with dialkyl carbonates (such as diethyl carbonate), diphenyl carbonate, or dioxolanones (such as cyclic carbonates having five- and six-member rings) in the presence of catalysts like alkali metal, tin catalysts, or titanium compounds. Useful polyols include, without limitation, any of those already mentioned. Aromatic polycarbonates are usually prepared from reaction of bisphenols, e.g., bisphenol A, with phosgene or diphenyl carbonate. Aliphatic polycarbonates may be preferred for a higher resistance to yellowing, particularly when the carbamate-functional material is used in an automotive OEM or refinish topcoat.

Polyesters polyols may be prepared by reacting: (a) polycarboxylic acids or their esterifiable derivatives, together if desired with monocarboxylic acids, (b) polyols, together if desired with mono functional alcohols, and (c) if desired, other modifying components. Nonlimiting examples of polycarboxylic acids and their esterifiable derivatives include phthalic acid, isophthalic acid, terephthalic acid, halophthalic acids such as tetrachloro- or tetrabromophthalic acid, adipic acid, glutaric acid, azelaic acid, sebacic acid, fumaric acid, maleic acid, trimellitic acid, pyromellitic acid, tetrahydrophthalic acid, hexahydrophthalic acid, 1,2-cyclohexanedicarboxlic acid, 1,3-cyclohexane-discarboxlic acid, 1,4-cyclohexane-dicarboxlic acid, 4-methylhexahydrophthalic acid, endomethylenetetrahydropthalic acid, tricyclodecane-dicarboxlic acid, endoethylenehexahydropthalic acid, camphoric acid, cyclohexanetetracarboxlic acid, and cyclobutanetetracarboxylic acid. The cycloaliphatic polycarboxylic acids may be employed either in their cis or in their trans form or as a mixture of the two forms. Esterifiable derivatives of these polycarboxylic acids include their single or multiple esters with aliphatic alcohols having 1 to 4 carbon atoms or hydroxy alcohols having up to 4 carbon atoms, preferably the methyl and ethyl ester, as well as the anhydrides of these polycarboxylic acids, where they exist. Nonlimiting examples of suitable monocarboxylic acids that can be used together with the polycarboxylic acids include benzoic acid, tert-butylbenzoic acid, lauric acid, isonoanoic acid and fatty acids of naturally occurring oils. Nonlimiting examples of suitable polyols include any of those already mentioned above, such as ethylene glycol, butylene glycol, neopentyl glycol, propanediols, butanediols, hexanediols, diethylene glycol, cyclohexanediol, cyclohexanedimethanol, trimethylpentanediol, ethylbutylpropanediol ditrimethylolpropane, trimethylolethane, trimethylolpropane, glycerol, pentaerythritol, dipentaerythritol, tris-hydroxyethyl isocyanate, polyethylene glycol, polypropylene glycol, and polyols derived from natural oils. Nonlimiting examples of monoalcohols that may be used together with the polyols include butanol, octanol, lauryl alcohol, and ethoxylated and propoxylated phenols. Nonlimiting examples of suitable modifying components include compounds which contain a group which is reactive with respect to the functional groups of the polyester, including polyisocyanates and/or diepoxide compounds, and also if desired, monoisocyanates and/or monoepoxide compounds. The polyester polymerization may be carried out by known standard methods. This reaction is conventionally carried out at temperatures of between 180° C. and 280° C., in the presence if desired of an appropriate esterification catalyst. Typical catalysts for the esterification polymerization are protonic acids, Lewis acids, titanium alkoxides, and dialkyltin oxides, for example lithium octanoate, dibutyltin oxide, dibutyltin dilaurate, para-toluensulfonic acid under reflux with small quantities of a suitable solvent as entraining agent such as an aromatic hydrocarbon, for example xylene, or a (cyclo)aliphatic hydrocarbon, for example cyclohexane.

Polyurethanes having hydroxyl functional groups may also be used in the coating compositions along with the hyperbranched polyol. Examples of suitable polyurethane polyols include polyester-polyurethanes, polyether-polyurethanes, and polycarbonate-polyurethanes, including, without limitation, polyurethanes polymerized using as polymeric diol reactants polyethers and polyesters including polycaprolactone polyesters or polycarbonate diols. These polymeric diol-based polyurethanes are prepared by reaction of the polymeric diol (polyester diol, polyether diol, polycaprolactone diol, polytetrahydrofuran diol, or polycarbonate diol), one or more polyisocyanates, and, optionally, one or more chain extension compounds. Chain extension compounds, as the term is being used, are compounds having two or more functional groups, preferably two functional groups, reactive with isocyanate groups, such as the diols, amino alcohols, and diamines. Preferably the polymeric diol-based polyurethane is substantially linear (i.e., substantially all of the reactants are difunctional).

Diisocyanates used in making the polyurethane polyols may be aromatic, aliphatic, or cycloaliphatic. Useful diisocyanate compounds include, without limitation, isophorone diisocyanate (IPDI), methylene bis-4-cyclohexyl isocyanate ($H_{12}$MDI), cyclohexyl diisocyanate (CHDI), m-tetramethyl xylene diisocyanate (m-TMXDI), p-tetramethyl xylene diisocyanate (p-TMXDI), 4,4'-methylene diphenyl diisocyanate (MDI, also known as 4,4'-diphenylmethane diisocyanate), 2,4- or 2,6-toluene diisocyanate (TDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, meta-xylylenediioscyanate and para-xylylenediisocyanate, 4-chloro-1,3-phenylene diisocyanate, 1,5-tetrahydro-naphthalene diisocyanate, 4,4'-dibenzyl diisocyanate, and xylylene diisocyanate (XDI), and combinations of these. Nonlimiting examples of higher-functionality polyisocyanates that may be used in limited amounts to produce branched thermoplastic polyurethanes (optionally along with monofunctional alcohols or monofunctional isocyanates) include 1,2,4-benzene triisocyanate, 1,3,6-hexamethylene triisocyanate, 1,6,11-undecane triisocyanate, bicycloheptane triisocyanate, triphenylmethane-4,4',4"-triisocyanate, isocyanurates of diisocyanates, biurets of diisocyanates, allophanates of diisocyanates, and the like.

In various embodiments, the polymeric diol preferably has a weight average molecular weight of at least about 500, more preferably at least about 1000, and even more preferably at least about 1800 and a weight average molecular weight of up to about 10,000, but polymeric diols having weight average molecular weights of up to about 5000, especially up to about 4000, may also be preferred. The polymeric diol advantageously has a weight average molecular weight in the range from about 500 to about 10,000, preferably from about 1000 to about 5000, and more preferably from about 1500 to about 4000. The weight average molecular weights may be determined by ASTM D-4274.

The reaction of the polyisocyanate, polymeric diol, and diol or other chain extension agent is typically carried out at an elevated temperature in the presence of a suitable catalyst, for example tertiary amines, zinc salts, and manganese salts. The ratio of polymeric diol, such as polyester diol, to extender can be varied within a relatively wide range depending largely on the desired hardness or flexibility of the final polyurethane elastomer. For example, the equivalent proportion of polyester diol to extender may be within the range of 1:0 to 1:12 and, more preferably, from 1:1 to 1:8. Preferably, the diisocyanate(s) employed are proportioned such that the overall ratio of equivalents of isocyanate to equivalents of active hydrogen containing materials is within the range of 1:1 to 1:1.05, and more preferably, 1:1 to 1:1.02. The polymeric diol segments typically are from about 35% to about 65% by weight of the polyurethane polymer, and preferably from about 35% to about 50% by weight of the polyurethane polymer.

A polysiloxane polyol may be made by hydrosilylating a polysiloxane containing silicon hydrides with an alkyenyl polyoxyalkylene alcohol containing two or three terminal primary hydroxyl groups, for example allylic polyoxyalkylene alcohols such as trimethylolpropane monoallyl ether and pentaerythritol monoallyl ether.

Any of the polyol resins and polymers described above may be derivatized to have carbamate groups according to known methods, for example by reaction of a hydroxyl-functional material with an alkyl carbamate, for example methyl carbamate or butyl carbamate, through what is referred to as "transcarbamation" or "transcarbamoylation." In other methods of forming carbamate-functional resins and polymers for use in the coating compositions, the resin and polymers may be polymerized using a carbamate-functional monomer.

The coating composition containing the hyperbranched polyol and optional further active hydrogen-functional resin or polymer also includes at least one crosslinker or curing agent reactive with hydroxyl groups, such as aminoplast crosslinkers having active methylol, methylalkoxy or butylalkoxy groups; polyisocyanate crosslinkers, which may have blocked or unblocked isocyanate groups; polyanhydrides; and polyepoxide functional crosslinkers or curing agents, which could be reactive with the hydroxyls as well as with carboxylic acid groups the hyperbranched polyols.

Aminoplasts, or amino resins, are described in *Encyclopedia of Polymer Science and Technology* vol. 1, p. 752-789 (1985), the disclosure of which is hereby incorporated by reference. An aminoplast is obtained by reaction of an activated nitrogen with a lower molecular weight aldehyde, optionally with further reaction with an alcohol (preferably a mono-alcohol with one to four carbon atoms such as methanol, isopropanol, n-butanol, isobutanol, etc.) to form an ether group. Preferred examples of activated nitrogens are activated amines such as melamine, benzoguanamine, cyclohexylcarboguanamine, and acetoguanamine; ureas, including urea itself, thiourea, ethyleneurea, dihydroxyethyleneurea, and guanylurea; glycoluril; amides, such as dicyandiamide; and carbamate-functional compounds having at least one primary carbamate group or at least two secondary carbamate groups. The activated nitrogen is reacted with a lower molecular weight aldehyde. The aldehyde may be selected from formaldehyde, acetaldehyde, crotonaldehyde, benzaldehyde, or other aldehydes used in making aminoplast resins, although formaldehyde and acetaldehyde, especially formaldehyde, are preferred. The activated nitrogen groups are at least partially alkylolated with the aldehyde, and may be fully alkylolated; preferably the activated nitrogen groups are fully alkylolated. The reaction may be catalyzed by an acid, e.g. as taught in U.S. Pat. No. 3,082,180, which is incorporated herein by reference.

The optional alkylol groups formed by the reaction of the activated nitrogen with aldehyde may be partially or fully etherified with one or more monofunctional alcohols. Suitable examples of the monofunctional alcohols include, without limitation, methanol, ethanol, n-propanol, isopropanol, n-butanol, isobutanol, tert-butyl alcohol, benzyl alcohol, and so on. Monofunctional alcohols having one to four carbon atoms and mixtures of these are preferred. The etherification may be carried out, for example, the processes disclosed in U.S. Pat. Nos. 4,105,708 and 4,293,692 incorporate the disclosures of which incorporated herein by reference. The aminoplast may be at least partially etherified, and in various embodiments the aminoplast is fully etherified. For example, the aminoplast compounds may have a plurality of methylol and/or etherified methylol, butylol, or alkylol groups, which may be present in any combination and along with unsubstituted nitrogen hydrogens. Examples of suitable curing agent compounds include, without limitation, melamine formaldehyde resins, including monomeric or polymeric melamine resins and partially or fully alkylated melamine resins, and urea resins (e.g., methylol ureas such as urea formaldehyde resin, and alkoxy ureas such as butylated urea formaldehyde resin). One nonlimiting example of a fully etherified melamine-formaldehyde resin is hexamethoxymethyl melamine.

The alkylol groups are capable of self reaction to form oligomeric and polymeric aminoplast crosslinking agents. Useful materials are characterized by a degree of polymerization. For melamine formaldehyde resins, it is preferred to use resins having a number average molecular weight less than about 2000, more preferably less than 1500, and even more preferably less than 1000.

A coating composition including aminoplast crosslinking agents may further include a strong acid catalyst to enhance the cure reaction. Such catalysts are well known in the art and include, for example, para-toluenesulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine.

Particularly for refinish coatings, polyisocyanate crosslinkers are commonly used. Examples of suitable polyisocyanate crosslinkers include, without limitation, alkylene polyisocyanates such as hexamethylene diisocyanate, 2,2,4- and/or 2,4,4-trimethylhexamethylene diisocyanate, dodecamethylene diisocyanate, 1,4-diisocyanatocyclohexane, 1-isocyanato-3,3,5-trimethyl-5-isocyanatomethylcyclohexane (isophorone diisocyanate), 2,4'- and/or 4,4'-diisocyanatodicyclohexylmethane, 3-isocyanato-methyl-3,5,5-trimethyl cyclohexyl isocyanate, aromatic polyisocyanates such as 2,4'- and/or 4,4'-diisocyanatodiphenylmethane, 2,4- and/or 2,6-diisocyanatotoluene, naphthylene diisocyanate, and mixtures of these polyisocyanates. Generally, polyisocyanates having three or more isocyanate groups are used; these may be derivatives or adducts of diisocyanates. Useful polyisocyanates may be obtained by reaction of an excess amount of an isocyanate with water, a polyol (for example, ethylene glycol, propylene glycol, 1,3-butylene glycol, neopentyl glycol, 2,2,4-trimethyl-1,3-pentane diol, hexamethylene glycol, cyclohexane dimethanol, hydrogenated bisphenol A, trimethylolpropane, trimethylolethane, 1,2,6-hexanetriol, glycerine, sorbitol or pentaerythritol), or by the reaction of the isocyanate with itself to give an isocyanurate. Examples include biuret-group-containing polyisocyanates, such as those described, for example, in U.S. Pat. Nos. 3,124,605 and 3,201,372 or DE-OS 1,101,394; isocyanurate-group-containing polyisocyanates, such as those described, for example, in U.S. Pat. No. 3,001,973, DE-PS 1,022,789, 1,222,067 and 1,027,394 and in DE-OS 1,929,034 and 2,004,048; urethane-group-containing polyisocyanates, such as those described, for example, in DE-OS 953,012, BE-PS 752,261 or U.S. Pat. Nos. 3,394,164 and 3,644,457; carbodiimide group-containing polyisocyanates, such as those described in DE-PS 1,092,007, U.S. Pat. No. 3,152,162 and DE-OS 2,504,400, 2,537,685 and 2,552,350; allophanate group-containing polyisocyanates, such as those described, for example, in GB-PS 994,890, BE-PS 761,626 and NL-OS 7,102,524; and uretdione group-containing polyisocyanates, such as those described in EP-A 0,377,177, each reference being incorporated herein by reference.

Such isocyanate crosslinkers for refinish coating compositions are commonly stored separately and combined with the hydroxyl-functional film-forming components shortly before application. For example, a two-part or two-pack or two-component refinish coating composition may include in a crosslinking part, package, or component one of aliphatic biurets and isocyanurates, such as the isocyanurates of hexamethylene diisocyanate and isophorone diisocyanate.

Curing catalysts for the urethane reaction such as tin catalysts can be used in the coating composition. Typical examples are without limitation, tin and bismuth compounds including dibutyltin dilaurate, dibutyltin oxide, and bismuth octoate. When used, catalysts are typically present in amounts of about 0.05 to 2 percent by weight tin based on weight of total nonvolatile vehicle.

A dianhydride may also be used to crosslink the hyperbranched polyol. Nonlimiting examples of di-cyclic carboxylic anhydrides include pyromellitic dianhydride, ethylenediaminetetraacetic dianhydride, cyclobutane-1,2,3,4-tetracarboxylic dianhydride, 3,3',4,4'-biphenyltetracarboxylic dianhydride, tetrahydrofurane-2,3,4,5-tetracarboxylic dianhydride, and cyclohexane-1,2,4,5-tetracarboxylic acid dianhydride.

Polyepoxide crosslinking agents include acrylic polymers having epoxide groups, for example copolymers of allyl glycidyl ether, glycidyl acrylate, or glycidyl methacrylate, as well as polyglycidyl esters and ethers of polyol and polycarboxylic acids.

The coating composition made with the hyperbranched polyol may further include solvents, pigments, fillers, or customary additives.

A solvent may optionally be utilized in the coating compositions. Although the coating composition may be formulated, for example, in the form of a powder, it is often desirable that the composition be in a substantially liquid state, which can be accomplished with the use of a solvent to either dissolve or disperse the hyperbranched polyol, crosslinker, and other film-forming material or materials. In general, depending on the solubility characteristics of the components, the solvent can be any organic solvent and/or water. In one preferred embodiment, the solvent is a polar organic solvent. For example, the solvent may be a polar aliphatic solvent or polar aromatic solvent. Among useful solvents are ketone, ester, acetate, aprotic amide, aprotic sulfoxide, and aprotic amine solvents. Examples of specific useful solvents include ketones, such as acetone, methyl ethyl ketone, methyl amyl ketone, methyl isobutyl ketone, esters such as ethyl acetate, butyl acetate, pentyl acetate, ethyl ethoxypropionate, ethylene glycol butyl ether acetate, propylene glycol monomethyl ether acetate, aliphatic and/or aromatic hydrocarbons such as toluene, xylene, solvent naphtha, and mineral spirits, ethers such as glycol ethers like propylene glycol monomethyl ether, alcohols such as ethanol, propanol, isopropanol, n-butanol, isobutanol, and tert-butanol, nitrogen-containing compounds such as N-methyl pyrrolidone and N-ethyl pyrrolidone, and combinations of these. In example embodiments, the liquid medium is water or a mixture of water with small amounts of organic water-soluble or water-miscible co-solvents. The solvent in the coating composition may be present in an amount of from about 0.01 weight percent to about 99 weight percent, or in an amount of from about 10 weight percent to about 60 weight percent, or in an amount of from about 30 weight percent to about 50 weight percent.

When the coating compositions are formulated as basecoat topcoats, monocoat topcoats, or primers they contain pigments and fillers, including special effect pigments. Nonlimiting examples of special effect pigments that may be utilized in basecoat and monocoat topcoat coating compositions include metallic, pearlescent, and color-variable effect flake pigments. Metallic (including pearlescent, and color-variable) topcoat colors are produced using one or more special flake pigments. Metallic colors are generally defined as colors having gonioapparent effects. For example, the American Society of Testing Methods (ASTM) document F284 defines metallic as "pertaining to the appearance of a gonioapparent material containing metal flake." Metallic basecoat colors may be produced using metallic flake pigments like aluminum flake pigments, coated aluminum flake pigments, copper flake pigments, zinc flake pigments, stainless steel flake pigments, and bronze flake pigments and/or using pearlescent flake pigments including treated micas like titanium dioxide-coated mica pigments and iron oxide-coated mica pigments to give the coatings a different appearance (degree of reflectance or color) when viewed at different angles. Metal flakes may be cornflake type, lenticular, or circulation-resistant; micas may be natural, synthetic, or aluminum oxide type. Flake pigments do not agglomerate and are not ground under high shear because high shear would break or bend the flakes or their crystalline morphology, diminishing or destroying the gonioapparent effects. The flake pigments are satisfactorily dispersed in a binder component by stirring under low shear. The flake pigment or pigments may be included in the high solids coating composition in an amount of about 0.01 wt. % to about 50 wt. % or about 15 wt. % to about 25 wt. %, in each case based on total binder weight. Nonlimiting examples of commercial flake pigments include PALIOCROME® pigments, available from BASF Corporation.

Nonlimiting examples of other suitable pigments and fillers that may be utilized in basecoat and monocoat topcoat coating compositions include inorganic pigments such as titanium dioxide, barium sulfate, carbon black, ocher, sienna, umber, hematite, limonite, red iron oxide, transparent red iron oxide, black iron oxide, brown iron oxide, chromium oxide green, strontium chromate, zinc phosphate, silicas such as fumed silica, calcium carbonate, talc, barytes, ferric ammonium ferrocyanide (Prussian blue), and ultramarine, and organic pigments such as metallized and nonmetallized azo reds, quinacridone reds and violets, perylene reds, copper phthalocyanine blues and greens, carbazole violet, monoarylide and diarylide yellows, benzimidazolone yellows, tolyl orange, naphthol orange, nanoparticles based on silicon dioxide, aluminum oxide or zirconium oxide, and so on. The pigment or pigments are preferably dispersed in a resin or polymer or with a pigment dispersant, such as binder resins of the kind already described, according to known methods. In general, the pigment and dispersing resin, polymer, or dispersant are brought into contact under a shear high enough to break the pigment agglomerates down to the primary pigment particles and to wet the surface of the pigment particles with the dispersing resin, polymer, or dispersant. The breaking of the agglomerates and wetting of the primary pigment particles are important for pigment stability and color development. Pigments and fillers may be utilized in amounts typically of up to about 60% by weight, based on total weight of the coating composition. The amount of pigment used depends on the nature of the pigment and on the depth of the color and/or the intensity of the effect it is intended to produce, and also by the dispersibility of the pigments in the pigmented coating composition. The pigment content, based in each case on the total weight of the pigmented coating composition, is preferably 0.5% to 50%, more preferably 1% to 30%, very preferably 2% to 20%, and more particularly 2.5% to 10% by weight.

Clearcoat coating compositions typically include no pigment, but may include small amount of colorants or fillers that do not unduly affect the transparency or desired clarity of the clearcoat coating layer produced from the composition.

Additional desired, customary coating additives agents may be included, for example, surfactants, stabilizers, wetting agents, dispersing agents, adhesion promoters, UV absorbers, hindered amine light stabilizers such as HALS compounds, benzotriazoles or oxalanilides; free-radical scavengers; slip additives; defoamers; reactive diluents, of the kind which are common knowledge from the prior art; wetting agents such as siloxanes, fluorine compounds, carboxylic monoesters, phosphoric esters, polyacrylic acids and their copolymers, for example polybutyl acrylate, or polyurethanes; adhesion promoters such as tricyclodecanedimethanol; flow control agents; film-forming assistants such as cellulose derivatives; rheology control additives, such as the additives known from patents WO 94/22968, EP-A-0 276 501, EP-A-0 249 201 or WO 97/12945; crosslinked polymeric microparticles, as disclosed for example in EP-A-0 008 127; inorganic phyllosilicates such as aluminum-magnesium silicates, sodium-magnesium and sodium-magnesium-fluorine-lithium phyllosilicates of the montmorillonite type; silicas such as Aerosils®.; or synthetic polymers containing ionic and/or associative groups such as polyvinyl alcohol, poly(meth)acrylamide, poly(meth)acrylic acid, polyvinylpyrrolidone, styrene-maleic anhydride copolymers or ethylene-maleic anhydride copolymers and their derivatives, or hydrophobically modified ethoxylated urethanes or polyacrylates; flame retardant; and so on. Typical coating compositions include one or a combination of such additives.

Coating compositions can be coated by any of a number of techniques well known in the art. These include, for example, spray coating, dip coating, roll coating, curtain coating, knife coating, spreading, pouring, dipping, impregnating, trickling or rolling, and the like. For automotive body panels, spray coating is typically used. Preference is given to employing spray application methods, such as compressed-air spraying, airless spraying, high-speed rotation, electrostatic spray application, alone or in conjunction with hot spray application such as hot-air spraying, for example.

The coating compositions and coating systems of the invention are employed in particular in the technologically and esthetically particularly demanding field of automotive OEM finishing and also of automotive refinish. The coating compositions can be used in both single-stage and multi-stage coating methods, particularly in methods where a pigmented basecoat or monocoat coating layer is first applied to an uncoated or precoated substrate and afterward another coating layer may optionally be applied when the pigmented film is a basecoat coating. The invention, accordingly, also provides multicoat coating systems comprising at least one pigmented basecoat and may have least one clearcoat disposed thereon, wherein either the clearcoat or the basecoat has been or both have been produced from the coating composition containing the hyperbranched polyol as disclosed herein. Both the basecoat and the clearcoat coating composition can include the disclosed hyperbranched polyol.

The applied coating compositions can be cured after a certain rest time or "flash" period. The rest time serves, for example, for the leveling and devolatilization of the coating films or for the evaporation of volatile constituents such as solvents. The rest time may be assisted or shortened by the application of elevated temperatures or by a reduced humidity, provided this does not entail any damage or alteration to the coating films, such as premature complete crosslinking, for instance. The thermal curing of the coating compositions has no peculiarities in terms of method but instead takes place in accordance with the typical, known methods such as heating in a forced-air oven or irradiation with IR lamps. The thermal cure may also take place in stages. Another preferred curing method is that of curing with near infrared (NIR) radiation. Although various methods of curing may be used, heat curing is preferred. Generally, heat curing is effected by exposing the coated article to elevated temperatures provided primarily by radiative heat sources. After application, the applied coating layer is cured, for example with heat at temperatures from 30 to 200° C., or from 40 to 190° C., or from 50 to 180° C., for a time of 1 min up to 10 h, more preferably 2 min up to 5 h, and in particular 3 min to 3 h, although longer cure times may also be employed at the temperatures employed for automotive refinish, which are preferably between 30 and 90° C. The hyperbranched polyol can be used for both refinish coatings and for original finish coatings that are cured at higher temperatures. A typical method for applying a refinish coating composition includes application and drying with cure at room temperature or at an elevated temperature between 30 and 90° C. OEM coatings are typically cured at higher temperatures, for example from about 110 to about 135° C. The curing time will vary depending on the particular components used, and physical parameters such as the thickness of the layers, however, typical curing times range from about 15 to about 60 minutes, and preferably about 15-25 minutes for blocked acid catalyzed systems and about 10-20 minutes for unblocked acid catalyzed systems.

Cured basecoat layers formed may have a thickness of from about 5 to about 75 µm, depending mainly upon the color desired and the thickness needed to form a continuous layer that will provide the color. Cured clearcoat layers formed typically have thicknesses of from about 30 µm to about 65 µm.

The coating composition can be applied onto many different types of substrates, including metal substrates such as bare steel, phosphated steel, galvanized steel, or aluminum; and non-metallic substrates, such as plastics and composites. The substrate may also be any of these materials having upon it already a layer of another coating, such as a layer of an electrodeposited primer, primer surfacer, and/or basecoat, cured or uncured.

The substrate may be first primed with an electrodeposition (electrocoat) primer. The electrodeposition composition can be any electrodeposition composition used in automotive vehicle coating operations. Non-limiting examples of electrocoat compositions include electrocoating compositions sold by BASF. Electrodeposition coating baths usually comprise an aqueous dispersion or emulsion including a principal film-forming epoxy resin having ionic stabilization (e.g., salted amine groups) in water or a mixture of water and organic cosolvent. Emulsified with the principal film-forming resin is a crosslinking agent that can react with functional groups on the principal resin under appropriate conditions, such as with the application of heat, and so cure the coating. Suitable examples of crosslinking agents, include, without limitation, blocked polyisocyanates. The electrodeposition coating compositions usually include one or more pigments, catalysts, plasticizers, coalescing aids, antifoaming aids, flow control agents, wetting agents, surfactants, UV absorbers, HALS compounds, antioxidants, and other additives.

The electrodeposition coating composition is preferably applied to a dry film thickness of 10 to 35 µm. After application, the coated vehicle body is removed from the bath and rinsed with deionized water. The coating may be cured under appropriate conditions, for example by baking at from about 135° C. to about 190° C. for between about 15 and about 60 minutes.

Because the coatings of the invention produced from the coating compositions of the invention adhere excellently even to electrocoats, surfacer coats, basecoat systems or typical, known clearcoat systems that have already cured, they are outstandingly suitable not only for use in automotive OEM finishing but also for automotive refinish or for the modular scratchproofing of automobile bodies that have already been painted.

The following examples illustrate, but do not in any way limit, the scope of the methods and compositions as described and claimed. All parts are parts by weight unless otherwise noted.

EXAMPLES

Example 1 of the Invention

Synthesis of a Flexible Hyperbranched Polyol

A reactor was charged with 13.056 parts by weight trimethylolpropane, 9.371 parts by weight sebacic acid, and 1.289 parts by weight mixed xylenes. The contents of the reactor were mixed and heated to 230° C. By-product water was removed as it was generated, and the temperature was maintained above 200° C. for about 5 hours, then as much of the xylenes was removed as possible and the reaction product was cooled to 90° C. To the reactor was then added 9.215 parts by weight of molten hexahydrophthalic anhydride (60° C.) and 4.533 parts by weight ethyl 3-ethoxypropionate. The contents of the reactor were stirred and heated to 115° C. After the exotherm peaked (keeping the temperature below 150° C.), the contents of the reactor were heated to 136° C., then cooled again to 90° C., and an additional 18.423 parts by weight of molten hexahydrophthalic anhydride (60° C.) were added followed by a flush of 0.258 parts by weight ethyl 3-ethoxypropionate. The contents of the reactor were stirred and heated to 115° C. After the exotherm peaked (keeping the temperature below 150° C.), the contents of the reactor were heated to 145° C. The temperature was maintained at 145° C. for 90 minutes, then cooled to 140° C. Keeping the temperature between 140-148° C., 41.053 parts by weight of Cardura™ E10-P (glycidyl ester of Versatic™ acid, a neo-carboxylic acid in which the carbon alpha to the carboxyl group bears a methyl group and two hydrocarbyl groups having a combined seven carbons atoms obtained from Momentive, Columbus, Ohio) was added over about 90 minutes, followed by a flush of 0.767 parts by weight ethyl 3-ethoxypropionate. The reaction mixture was held at 145° C. for 3 hours, then cooled and reduced with 2.036 parts by weight of Aromatic 100.

Example 2 of the Invention

Synthesis of a Flexible Hyperbranched Polyol

A reactor was charged with 10.898 parts by weight trimethylolpropane, 20.645 parts by weight Pripol 1009 (dimer fatty acid, obtained from Croda International Plc), and 1.266 parts by weight mixed xylenes. The contents of the reactor were mixed and heated to 230° C. By-product water was removed as it was generated, and the temperature was maintained above 200° C. for about 5 hours, then as much of the xylenes was removed as possible and the reaction product was cooled to 90° C. To the reactor was then added 7.927 parts by weight of molten hexahydrophthalic anhydride (60° C.) and 4.508 parts by weight ethyl 3-ethoxypropionate. The contents of the reactor were stirred and heated to 115° C. After the exotherm peaked (keeping the temperature below 150° C.), the contents of the reactor were heated to 136° C., then cooled again to 90° C., and an additional 15.864 parts by weight of molten hexahydrophthalic anhydride (60° C.) were added followed by a flush of 0.253 parts by weight ethyl 3-ethoxypropionate. The contents of the reactor were stirred and heated to 115° C. After the exotherm peaked (keeping the temperature below 150° C.), the contents of the reactor were heated to 145° C. The temperature was maintained at 145° C. for 90 minutes, then cooled to 140° C. Keeping the temperature between 140-148° C., 35.347 parts by weight of Cardura™ E10-P was added over about 90 minutes, followed by a flush of 0.76 parts by weight ethyl 3-ethoxypropionate. The reaction mixture was held at 145° C. for 3 hours, then cooled and reduced with 2.533 parts by weight of Aromatic 100.

Example 3 of the Invention

Synthesis of a Lower Flexibility Hyperbranched Polyol

A reactor was charged with 13.442 parts by weight trimethylolpropane, 7.073 parts by weight adipic acid, and 1.267 parts by weight mixed xylenes. The contents of the reactor were mixed and heated to 230° C. By-product water was removed as it was generated, and the temperature was maintained above 200° C. for about 5 hours, then as much of the xylenes was removed as possible and the reaction product was cooled to 90° C. To the reactor was then added 9.411 parts by weight of molten hexahydrophthalic anhydride (60° C.) and 4.509 parts by weight ethyl 3-ethoxypropionate. The contents of the reactor were stirred and heated to 115° C. After the exotherm peaked (keeping the temperature below 150° C.), the contents of the reactor were heated to 136° C., then cooled again to 90° C., and an additional 18.817 parts by weight of molten hexahydrophthalic anhydride (60° C.) were added followed by a flush of 0.253 parts by weight ethyl 3-ethoxypropionate. The contents of the reactor were stirred and heated to 115° C. After the exotherm peaked (keeping the temperature below 150° C.), the contents of the reactor were heated to 145° C. The temperature was maintained at 145° C. for 90 minutes, then cooled to 140° C. Keeping the temperature between 140-148° C., 41.934 parts by weight of Cardura™ E10-P was added over about 90 minutes, followed by a flush of 0.76 parts by weight ethyl 3-ethoxypropionate. The reaction mixture was held at 145° C. for 3 hours, then cooled and reduced with 2.533 parts by weight of Aromatic 100.

Coating Examples

A silver basecoat coating composition Example 4 of the invention was compared to a silver basecoat Comparative Example A prepared without the flexible hyperbranched polyol. The compositions are shown in the following Table 1; all parts are by weight.

TABLE 1

| Component | Example 4 of the invention | Comparative Example A |
|---|---|---|
| Example 3 Flexible hyperbranched polyol | 6.85 | 0.00 |
| Hydroxyl-functional acrylic resin 1 | 9.00 | 9.00 |
| Hydroxyl-functional acrylic resin 2 | 4.54 | 11.39 |
| Melamine resin 1 | 6.25 | 6.25 |
| Melamine resin 2 | 6.25 | 6.25 |
| Rheology control resin | 26.51 | 26.51 |
| Acrylic Flow Control Resin | 0.04 | 0.04 |
| UV Absorber | 0.15 | 0.15 |
| Acid catalyst | 2.05 | 2.05 |
| CAB solution | 2.03 | 2.03 |
| Aluminum Pigment Slurry | 23.25 | 23.25 |
| Pentyl propionate | 2.92 | 2.92 |
| Solvesso 100 | 3.00 | 3.00 |
| Butyl Acetate | 7.17 | 7.17 |

The volatile organic content of the silver basecoat compositions of Example 4 and of Comparative Example A were each measured according to ASTM Test Method D3960. The volatile organic content of Example 4 was 7% lower than the volatile organic content of Comparative Example A.

Each of the silver basecoat compositions of Example 4 and of Comparative Example A was applied to a test panel. A commercial clearcoat was applied over the basecoats, and the composite basecoat-clearcoat coatings were then cured. The test panels were subjected to gravelometer testing according to the test procedure of SAE J400. Briefly, in the SAE J400 procedure, the panels are cooled to −20 centigrade for 1 hour prior to the gravel test. The panel is positioned in a gravelometer machine in an upright position, 90 degrees from path of gravel. One pint of gravel is blown onto the panel with an air pressure of 70 psi. The panel is then warmed to room temperature, tape pulled with 3M 898 strapping tape, and the extent of stonechipping and sizes of the chips are observed. The test panel of Example 4 was observed to have 60% fewer chips to metal as compared to the test panel of Comparative Example A.

A white basecoat coating composition Example 5 of the invention was compared to a white basecoat Comparative Example B prepared without the flexible hyperbranched polyol. The compositions are shown in the following Table 2; all parts are by weight.

TABLE 2

| Component | Example 5 of the invention | Comparative Example B |
|---|---|---|
| Example 3 Flexible hyperbranched polyol | 12.59 | 0.00 |
| Hydroxyl-functional acrylic resin 1 | 6.03 | 6.03 |
| Hydroxyl-functional acrylic resin 2 | 4.79 | 17.38 |
| Melamine resin 1 | 9.43 | 9.43 |
| Rheology control resin | 11.45 | 1145 |
| Acrylic Flow Control Resin | 0.09 | 0.09 |
| UV Absorber | 0.13 | 0.13 |
| Acid catalyst | 1.59 | 1.59 |
| White pigment paste 1 | 36.46 | 36.46 |
| Pigment paste 2 | 5.55 | 5.55 |
| Tinting pigment paste 1 | 0.01 | 0.01 |
| Tinting pigment paste 2 | 0.03 | 0.03 |
| Ethanol, 88% denatured | 1.00 | 1.00 |
| Butyl Acetate | 10.85 | 10.85 |

The volatile organic content of the white basecoat compositions of Example 5 and of Comparative Example B were each measured according to ASTM Test Method D3960. The volatile organic content of Example 5 was 6% lower than the volatile organic content of Comparative Example B.

Each of the white basecoat compositions of Example 5 and of Comparative Example B was applied to a test panel. A commercial clearcoat was applied over the basecoats, and the composite basecoat-clearcoat coatings were then cured. The test panels were subjected to gravelometer testing according to the test procedure of SAE J400. The test panel of Example 5 was observed to have 50% fewer chips to metal as compared to the test panel of Comparative Example B.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A coating composition, comprising a flexible hyperbranched polyol prepared by
    (a) reacting a polyol comprising at least three hydroxyl groups with an aliphatic dicarboxylic acid having from 6 to 36 carbon atoms or an esterifiable derivative of the aliphatic dicarboxylic acid to form a hydroxyl-functional first intermediate product;

(b) reacting the first intermediate product with a cyclic carboxylic acid anhydride to form a carboxylic acid-functional second intermediate product; and (c) reacting the second intermediate product with an epoxide-functional compound having one epoxide group to form the hyperbranched polyol.

2. The coating composition according to claim 1, wherein a ratio in step (a) of moles of the polyol to moles of the dicarboxylic acid or the esterifiable derivative of the aliphatic dicarboxylic acid is from about 2.0 to about 2.2 moles of the polyol per mole of the dicarboxylic acid or esterifiable derivative of the aliphatic dicarboxylic acid.

3. The coating composition according to claim 1, wherein an equivalent ratio in step (b) of hydroxyl groups of the first intermediate product to anhydride groups of the cyclic carboxylic acid anhydride is from about 1.0 to about 1.25 equivalents of hydroxyl groups per carboxylic anhydride groups.

4. The coating composition according to claim 1, wherein an equivalent ratio in step (c) of carboxylic acid groups of the second intermediate product to epoxide groups of the epoxide-functional compound is from about 10 to about 2.5 equivalents of carboxylic acid groups per equivalents epoxide groups.

5. The coating composition according to claim 1, wherein:
the coating composition is aqueous; and
an equivalent ratio in step (c) of carboxylic acid groups of the second intermediate product to epoxide groups of the epoxide-functional compound is from about 1.1 to about 2.5 equivalents of carboxylic acid groups per equivalents epoxide groups and unreacted carboxylic acid groups are at least partially neutralized with a base.

6. A method of coating a substrate, the method comprising applying to the substrate the coating composition of claim 1 to form a coating layer and curing the coating layer.

7. The method according to claim 6, wherein the coating layer is pigmented.

8. The method according to claim 7, wherein a clearcoat composition is applied over the coating layer to form a clearcoat layer and the coating layer and clearcoat layer are cured together.

9. The method according to claim 6, wherein the coating layer is unpigmented.

10. The method according to claim 6, wherein the coating layer is applied as a refinish coating on the substrate.

11. A method of making a flexible hyperbranched polyol, the method comprising:

(a) reacting a polyol comprising at least three hydroxyl groups with an aliphatic dicarboxylic acid having from 6 to 36 carbon atoms or an esterifiable derivative of the aliphatic dicarboxylic acid to form a hydroxyl-functional first intermediate product;

(b) reacting the first intermediate product with a cyclic carboxylic acid anhydride to form a carboxylic acid-functional second intermediate product; and (c) reacting the second intermediate product with an epoxide-functional compound having one epoxide group to form the hyperbranched polyol.

12. The method according to claim 11, wherein a ratio in step (a) of moles of the polyol to moles of the dicarboxylic acid or esterifiable derivative of the aliphatic dicarboxylic acid is from about 2.0 to about 2.2 moles of the polyol per mole of the dicarboxylic acid or esterifiable derivative of the aliphatic dicarboxylic acid.

13. The method according to claim 11, wherein an equivalent ratio in step (b) of hydroxyl groups of the first intermediate product to anhydride groups of the cyclic carboxylic acid anhydride is from about 1.0 to about 1.25 equivalents of hydroxyl groups per carboxylic anhydride groups.

14. The method according to claim 11, wherein an equivalent ratio in step (c) of carboxylic acid groups of the second intermediate product to epoxide groups of the epoxide-functional compound is from about 1.0 to about 2.5 equivalents of carboxylic acid groups per equivalents epoxide groups.

15. The method according to claim 11, wherein an equivalent ratio in step (c) of carboxylic acid groups of the second intermediate product to epoxide groups of the epoxide-functional compound is from about 1.1 to about 2.5 equivalents of carboxylic acid groups per equivalents epoxide groups and unreacted carboxylic acid groups are at least partially neutralized with a base and the hyperbranched polyol is dispersed in an aqueous medium.

\* \* \* \* \*

UNITED STATES PATENT AND TRADEMARK OFFICE
CERTIFICATE OF CORRECTION

| | |
|---|---|
| PATENT NO. | : 10,883,013 B2 |
| APPLICATION NO. | : 15/326722 |
| DATED | : January 5, 2021 |
| INVENTOR(S) | : Colyer |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 450 days.

Signed and Sealed this
Fourteenth Day of February, 2023

Katherine Kelly Vidal
*Director of the United States Patent and Trademark Office*